United States Patent [19]

Snyderwine et al.

[11] Patent Number: 5,097,451
[45] Date of Patent: Mar. 17, 1992

[54] RADIAL DAMPER DISK

[75] Inventors: Martha E. Snyderwine, Holland; Saroja Mahadevan, Abington, both of Pa.

[73] Assignee: The United States of America as represented by the Secretary of the Navy, Washington, D.C.

[21] Appl. No.: 633,549

[22] Filed: Dec. 20, 1990

[51] Int. Cl.$^5$ .............................................. H04B 17/00
[52] U.S. Cl. ............................................ 367/4; 367/12
[58] Field of Search ........................... 367/4, 12, 173; 114/326, 293, 230; 441/33

[56] References Cited

U.S. PATENT DOCUMENTS 3,851,348  12/1974  Gilbert et al. .
4,096,598   6/1978  Mason .
4,189,703   2/1980  Bennett .
4,853,900   8/1989  Snyderwine ..................... 367/4

Primary Examiner—Daniel T. Pihulic
Attorney, Agent, or Firm—James V. Tura; James B. Bechtel; Susan E. Verona

[57] ABSTRACT

A motion dampening device is described that is efficiently and conveniently packaged with sonobuoy components to reduce the effects of vertical motion caused by surface waves or internal buoyant forces. A plurality of spring steel spokes connected by sections of thin plastic sheet are fitted around a central core around a first-deployed element. As this element is packed, prior to deployment, the spokes and plastic sheet are wrapped around the core. Upon deployment, the stored spring forces push open to their extended positions and spread the plastic sheet, thereby impeding vertical motion of the element and reducing effects of flow noise on a sensor hanging therefrom.

12 Claims, 4 Drawing Sheets

2a

2b

2c

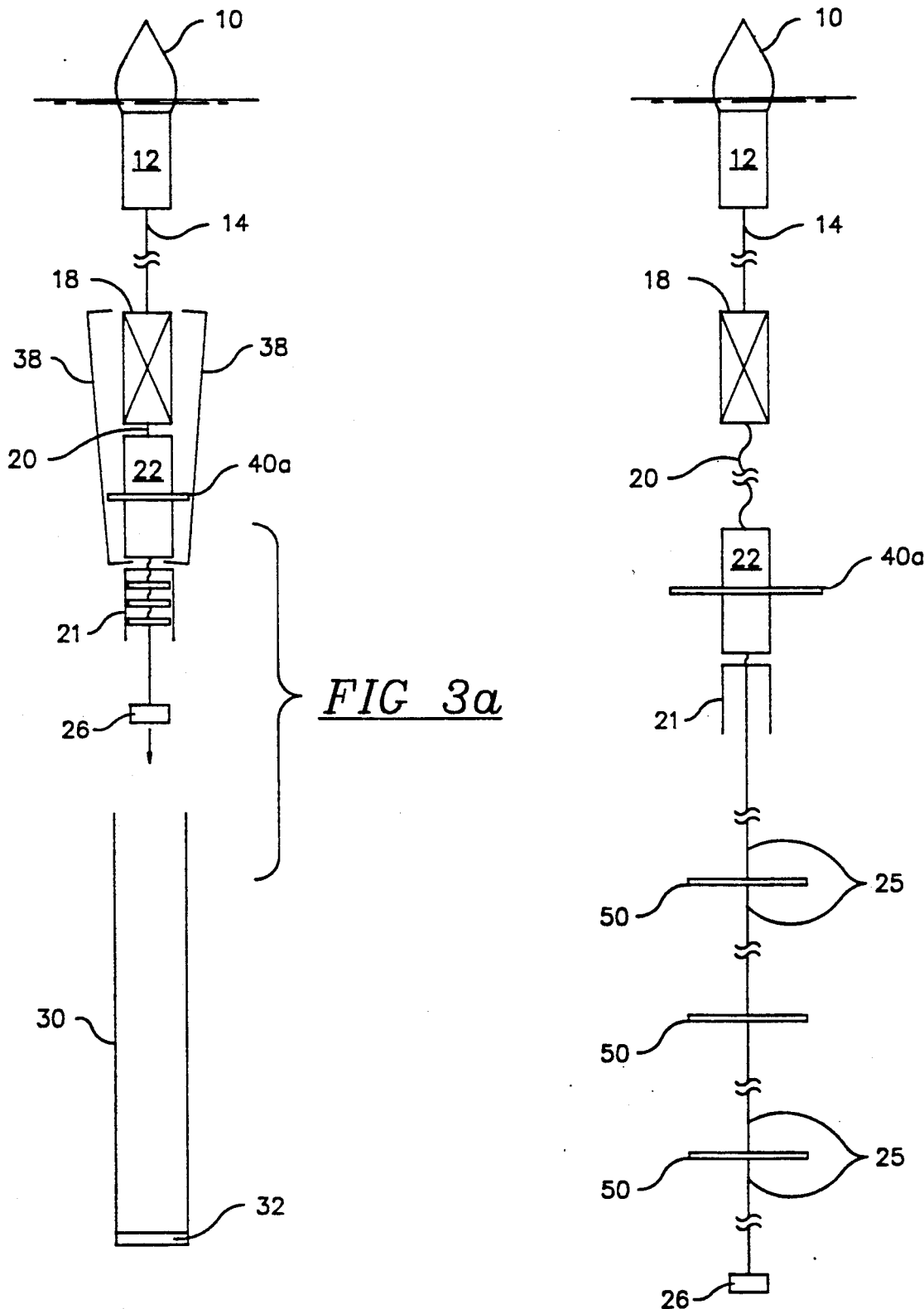

5,097,451

RADIAL DAMPER DISK

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to sonobuoy-type, under-the-surface floating sensors and especially to devices that are able to quiet flow noise detected by said sensors caused by surface-wave motion.

BACKGROUND OF THE INVENTION

Sonobuoy devices are widely employed for submarine detection purposes, and are also utilized for underwater geological exploration. Sonobuoys may be either active, wherein a transmitted signal is produced and the reflected signal is received, and transmitted, or the sonobuoy may be passive wherein signals are sensed and then sent to a distant processor.

In many standard configurations, a buoy system has a number of components stored inside a casing adapted to be dropped into the water, either from the air or a marine craft. The casing has a negative buoyancy which causes it to sink, and houses, among other things, a float deployment mechanism that is activated upon the casing entering the water and that will ride on the surface. As the casing sinks into the water, various components, including the sensor, are deployed therefrom, attached to the surface float by various lengths of cables. It is known that this type of buoy deployment system will set up a situation where surface-wave induced bobbing or drifting motion will cause flow noise to be detected by the sensor.

One known method of attempting to eliminate flow noise is to suspend the sensor from a neutrally buoyant float, that is linked via fiber-optic cable, to the antenna. Once the neutrally buoyant float has been deployed, and the sensor properly arranged in relation thereto, signals are transmitted via the fiber optical cable to the floating antenna. Practice has shown, however, that it is sometimes difficult to properly deploy the individual components of such a system without the fiber optic cable pack receiving damage. Although the system has two or three standard damper disks attached to a cabe to deploy beneath the buoyant can, these disks do not, in many instances, prevent this buoyant can from initially rising up to, or above, the fiber optical cable pack and bumping this pack and causing damage thereto or wrapping excess cable therearound. The instant invention provides the necessary drag on the buoyant can to cause it to initially maintain the nominal separation distance during the deployment, until the full complement of components is settled.

SUMMARY OF THE INVENTION

It is therefore an object of the present invention to provide a means that will prevent vertical motion of, and maintain the separation distance between, components in deployed sonobuoy system.

It is a further object of the present invention to provide a means that will maintain the separation distance and that is easily and efficiently packaged prior to deployment.

It is a still further object of the present invention to provide a means to provide separation between components that can be easily installed on selected components.

These and other objects and many attendant advantages of the present invention are obtained where a vertical motion dampening device that may be attached to a sonobuoy component is disclosed. The device is comprised of, in a preferred embodiment, a central hoop with a plurality of spring steel or nylon bands attached thereto and with a water imprevious sheath placed over said bands. The bands are attached to the central hoop by spot welding or other means known in the art and the sheath material is attached to the edges of each band either on both sides or on a single, upper or lower, surface. The bands can be attached in a wagon-wheel pattern or arranged as curved vanes such as seen in many pumps. In an alternate embodiment, the bands are attached directly to the component.

As the component is packed with other parts, the bands and sheath are wrapped in a horizontal direction, either clockwise or counterclockwise, around the central hoop. Retaining means is used to maintain this configuration until the sonobuoy is deployed.

The novel features which are believed to be characteristics of the invention, both as to its organization and methods of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIGS. 3a and 3b show schematic representations of a sonobuoy system with the present invention deploying in the water;

DETAILED DESCRIPTION OF THE PREFERRED EMBODIMENT

Figures 1A, 1B, 1C, 1D, 1E:
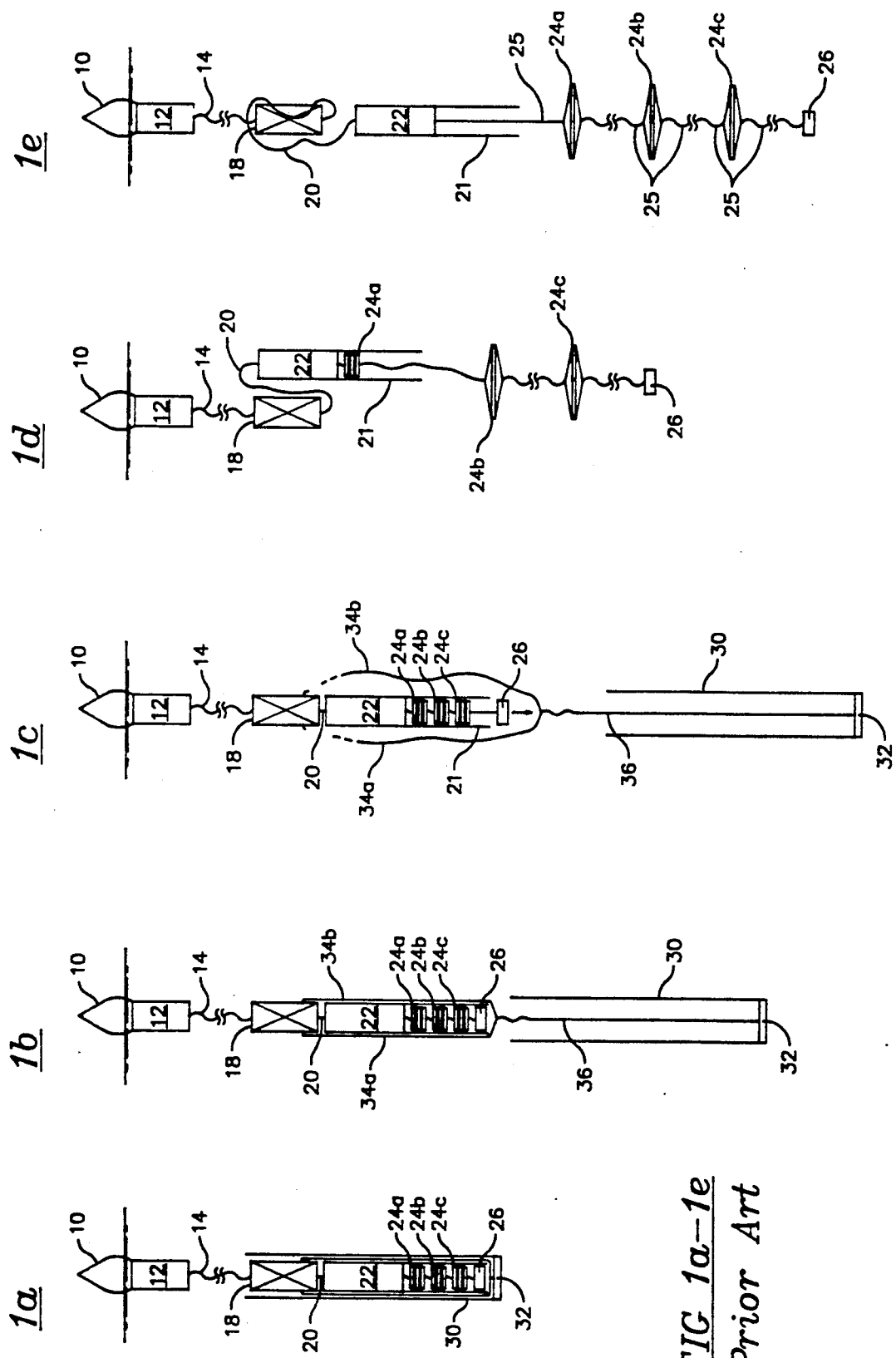
FIGS. 1a-1e show a series of schematic representations of a prior art sonobuoy system deploying in the water.

Referring now to the drawings, wherein like reference characters designate like or corresponding arts throughout the several views, FIGS. 1a-1e show schematically the stages that sonobuoy systems evolve through as they are deployed in the water. Starting with FIG. 1a, the surface float and antenna 10 and upper housing 12 remain at the surface while the remaining components, connected by telemetry cable 14, sink to predetermined depths. Immediately below the upper housing are the fiber optic cable pack 18 with cable 20, and an auxillary disk housing 21 containing a neutrally buoyant can 22, up to three standard damper disks 24a, b and c and the sensor 26. These components are contained within a descent cannister 30, which cannister is further driven downward by weight 32. The entire lower part of the system is held together by two retaining straps 34a,b which are tethered by a line 36 to weight 32 and which will break (as seen in FIG. 1c) to release the sensor 26, the standard damper disks 24a–c (as seen in FIG. 1e) and the can 22. In normal practice, once descent cannister 30 pulls away and breaks retaining straps 34a,b, sensor 26 and disks 24a–c begin to deploy from auxillary disk housing 21. The weight of sensor 26 pulls bottom disk 24c out of housing 21 first and once it is free of housing 21 (and neutrally buoyant can 22 and the remaining disks), it no longer can act to stop any vertical rise of can 22. It is at this stage of the deployment that problems begin. The weight of sensor 26 pulls disk 24c out of housing 21 first and it has no dampening effect on can 22 (which has positive buoyancy). The same problem is repeated when the second disk 24b is pulled out, as seen in FIG. 1d, in that can 22 can still rise. Possible damage to cable pack 18 can occur if can 22 slams into it or the cable 20 connecting to can 22 may become entagled with pack 18.

Figure 2A:
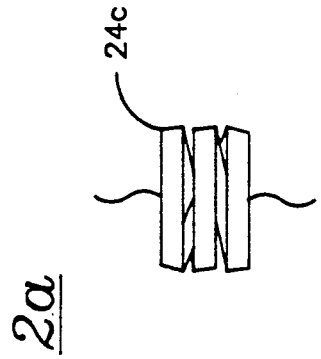
FIGS. 2a-2c show various views of a single prior art damper disk, both as packaged prior to deployment (FIG. 2a) and as fully opened up after deployment (FIGS. 2b and 2c)
Figure 2B:
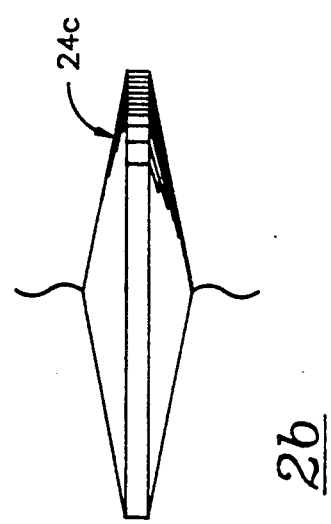
Figure 2C:
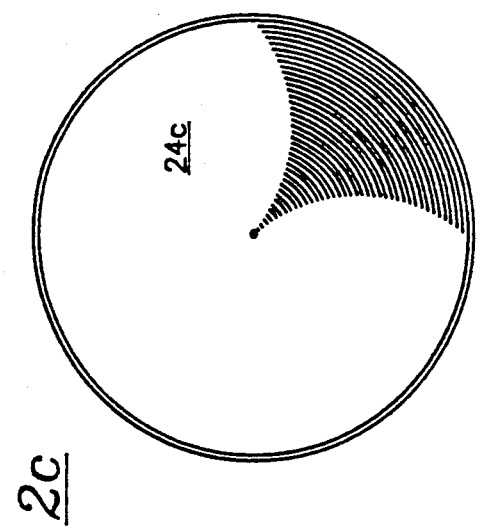

FIG. 2a–c shows isolated views of standard damper disk 24c, first, as it is twisted up for storage, then an elevation view, and finally a plan view (both when the disk is unfolded). Damper disks 24 are presently used in an attempt to limit vertical motion of the deployed sonobuoy system. The suspension cable 25 is routed from sensor 26 through discs 24 to float 10. Disks 24 are typically fabricated from a single circular band of spring steel covered with a thin plastic sheath or ripstop nylon.

FIGS. 3a and 3b show schematically how the sonobuoy system works when a radial damper disk 40 is incorporated into the system. FIGS. 4a–f and 5 show isolated views of different embodiments of the invention used, or that could be used in the system. As shown in FIG. 3a, surface float and antenna 10 and upper housing 12 remain at the surface while the remaining components descend. Fiber optic cable pack 18, connected to float and antenna 10 via cable 14, is further connected to neutrally buoyant can 22 by fiber optic cable 20. Can 22 has a radial damper disk 40a attached around its perimeter, by fasteners or other means known in the industry (not shown in FIG. 3a) at about the midpoint of the can.

Retaining means 38, such as two halves of a right circular cylinder, are releasably held together to close over and restrain individual bands 44a (as seen in FIGS. 4a, 4c, 4d and 4e) from springing open. Once means 38 pops open, disk 40a is free to open up, as seen in FIG. 3b.

Disk 40a is constructed by placing a hoop 42a of spring steel or other similar elastic-like material around the mid-point of can 22 and attaching spokes 44a thereto, in a radiating manner, made of either spring steel or type 6.6 nylon or other similar materials, such as by tack welding or other similar means. In one embodiment, hoop 42a can be constructed with a diameter of 4.25 inches and spokes 44a can be made in thin, flat bands being 12 inches long, 0.5 inches wide and about 0.00625 inches thick. Spokes 44a are attached to hoop 42a at an end so that the wide flat side faces out, allowing them to be wrapped in a clockwise direction (as shown by the directional arrows in FIG. 4a) around can 22. Individual sectors 46 of a thin flexible plastic covering (at least 10 mils thick) are attached, by means known in the art, in between spokes 44a.

Figure 4A:
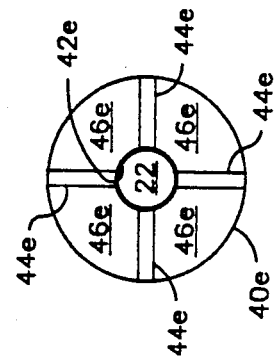
FIGS. 4a-4e and FIG. 5 show views of the various embodiments of the instant invention, with FIG. 4a showing a plan view of one embodiment and FIG. 4b showing an elevational view thereof, FIG. 4c showing a plan view of a first alternate embodiment, FIG. 4d showing a plan view of a second alternate embodiment, FIG. 4e showing a plan view of a third embodiment and FIG. 4f showing an elevational view thereof and FIG. 5 showing a plan view of a radial damper disk to be used independently of a component.
Figure 4C:
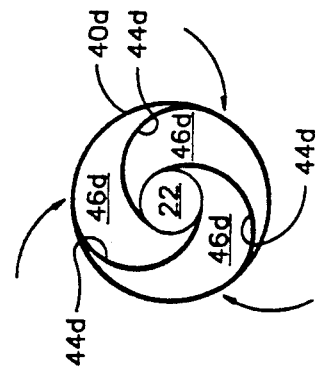
Figure 4B:
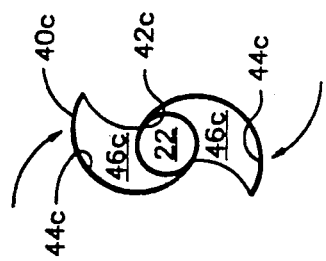
Figure 4D:
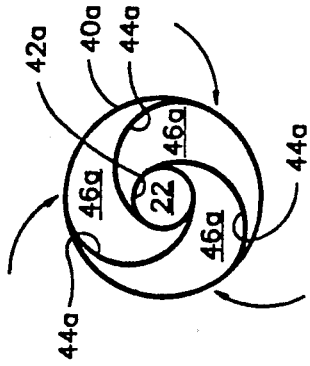
Figure 4E:
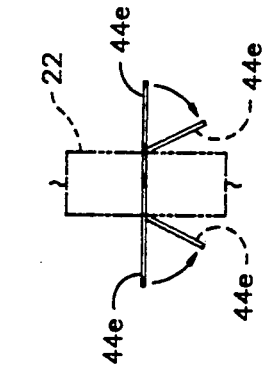

Alternate embodiments of the present invention are shown in FIGS. 4c, 4d and 4e. In FIGS. 4c and 4d, spokes 44 are attached directly to can 22, by means known, and, as shown in FIG. 4c, it may sometimes be desireable to use only two spokes 44c and two sectors of sheath 46c.

Figure 4F:
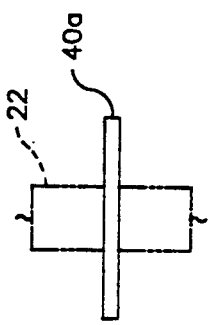

FIGS. 4e and 4f show that a radial damper disk may be formed to fold along the longitudinal sides of can 22 (as shown by the arrows in FIG. 4f). This alternate embodiment has four quarter-circle panels 46 attached between spokes 44e.

Figure 5:
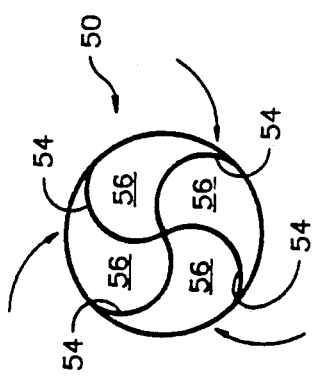

An additional alternate embodiment of the radial damper disk is seen in FIGS. 3b and 5. In this embodiment, individual spokes 54 are each joined at a first end thereof to each other or to a thin piece of tubing 52. As with the other forms, sectors 56 of a thin plastic sheath are attached between spokes 54. This embodiment is used as the damper disks that are pulled out of the lower auxillary housing 21. As with all of the other versions of radial damper disks, disk 50 quickly unfolds as soon as it is pulled free from housing 21.

Finally, while the radial damper disk has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

What we claim is:

1. A radial damper disk to be used with a system of sonobuoy components to prevent vertical movement of a component once it has been deployed into a fluid medium, comprising:

a central hoop of predetermined diameter contiguous with and surroundingly attached at the midpoint of the component;

a plurality of bands flexibly attached to and extending radially away from said hoop; and covering means attached to said bands in a predetermined pattern.

2. A radial damper disk as described in claim 1 wherein said covering means is attached above and below said bands.

3. A radial damper disk as described in claim 1 wherein said bands are foldable around said central hoop, in a planar direction.

4. A radial damper disk as described in claim 1 wherein said bands are made of spring steel.

5. A radial damper disk as described in claim 1 wherein said covering means is a thin flexible sheet.

6. A radial damper disk comprising at least two strips elastic-like material bound together at a central hub and held together between adjacent, facing sides by sections of plastic sheet.

7. An improved sonobuoy dampening system including a cylindrical descent cannister for housing a fiber optic cable pack, a neutrally-buoyant can, a plurality of damper disks and a sensor, the improvement comprising:

a. attaching a central hoop of predetermined diameter to said can at a midpoint thereof;

b. extending a plurality of flexible bands radially from said hoop; and c. attaching covering means to elongated surfaces of said bands in a predetermined pattern.

8. An improved sonobuoy dampening system as described in claim 7 wherein said covering means is attached above and below said bands.

9. An improved sonobuoy dampening system as described in claim 7 wherein said bands are foldable around said central hoop in a planar direction.

10. An improved sonobuoy dampening system as described in claim 7 wherein said bands are made of spring steel.

11. An improved sonobuoy dampening system as described in claim 7 wherein said covering means is a thin flexible sheet.

12. An improved sonobuoy dampening system including a cylindrical descent cannister for housing a fiber optic cable pack, a neutrally-buoyant can, a plurality of damper disks and a sensor, the improvement comprising:

attaching at least two strips of elastic-like material to said can and joining said strips with sections of thin plastic sheet.

* * * * *